(12) United States Patent
Velte

(10) Patent No.: US 8,020,868 B1
(45) Date of Patent: Sep. 20, 2011

(54) MAGNETIC BOARD GAME

(76) Inventor: Steven Velte, Tampa, FL (US)

( * ) Notice: Subject to any disclaimer, the term of this patent is extended or adjusted under 35 U.S.C. 154(b) by 135 days.

(21) Appl. No.: 12/082,881

(22) Filed: Apr. 15, 2008

Related U.S. Application Data

(60) Provisional application No. 60/969,553, filed on Aug. 31, 2007.

(51) Int. Cl.
  *A63F 3/00* (2006.01)
(52) U.S. Cl. ........................................ 273/239; 273/287
(58) Field of Classification Search .................. 273/241, 273/242, 287, 239, 443, 448, 456
  See application file for complete search history.

(56) References Cited

U.S. PATENT DOCUMENTS

| | | | | |
|---|---|---|---|---|
| 2,863,666 A | * | 12/1958 | Aronson | 273/108 |
| 4,339,136 A | * | 7/1982 | Gittings | 273/242 |
| 5,039,099 A | * | 8/1991 | Bravo | 273/126 A |

* cited by examiner

*Primary Examiner* — Vishu K. Mendiratta

(57) ABSTRACT

An insert has a bottom with sides and a contoured top. The container has semi-spherical concave valleys. The valleys are positioned in rows and columns. The insert is fabricated of a resilient non-magnetically-responsive material. A plurality of magnets is provided. Each magnet has faces defining a thickness and a periphery. The periphery of the magnets have various geometric shapes.

6 Claims, 3 Drawing Sheets

MAGNETIC BOARD GAME

RELATED APPLICATION

The present invention is based upon Provisional Application No. 60/969,553 filed Aug. 31, 2007, the subject matter of which is incorporated herein by reference.

BACKGROUND OF THE INVENTION

Field of the Invention

The present invention relates to a magnetic board game and more particularly pertains to providing a competitive challenge combining chance, strategy and agility, mental and physical, while teaching players the properties of magnets, all in an entertaining and educational manner.

SUMMARY OF THE INVENTION

In view of the disadvantages inherent in the known types of games of known designs and configurations now present in the prior art, the present invention provides an improved magnetic board game. As such, the general purpose of the present invention, which will be described subsequently in greater detail, is to provide a new and improved magnetic board game and method which has all the advantages of the prior art and none of the disadvantages.

To attain this, the present invention essentially comprises a magnetic board game. First provided is a board. The board includes a container. The container has a rectangular open base. The open base is positionable in a horizontal orientation during use. The container has vertically extending peripheral side walls. The base and side walls define a rectilinear chamber. The side walls are fabricated of a stiff non-magnetically-responsive wood or plastic.

The board also includes an insert. The insert has a rectangular bottom. The bottom is positioned adjacent to the base of the container. The insert has sides. The sides of the insert are positioned in contact with the side walls of the container. The insert has a contoured top. The contoured top has semi-spherical convex peaks. The contoured top has semi-spherical concave valleys. The valleys are positioned in rows and columns. Each row is off-set from its next adjacent row. Each column is off-set from its next adjacent column. In this manner each valley is equally spaced at about 1.25 inches plus or minus 10 percent from all immediately surrounding valleys. The peaks are positioned in rows and columns. Each row is off-set from its next adjacent row. Each column is off-set from its next adjacent column. In this manner each peak is equally spaced at about 1.25 inches plus or minus 10 percent from all immediately surrounding peaks. Each insert has between 20 and 25 valleys. Each insert has a corresponding number of peaks, preferably or valleys. Each peak and valley are at a common elevation with a 1.00 inch elevational spacing between the peaks and valleys. The insert is fabricated of a resilient non-magnetically-responsive open cell polyurethane foam.

A plurality of hematite magnets is provided. There are 18 magnets in the preferred embodiment. The magnets have faces. In this manner a thickness of between 0.40 inches and 0.60 inches, preferably 0.50 inches, plus or minus 10 percent, is defined. Each magnet has a periphery 40. The periphery is between 2.25 inches and 3.25 inches, preferably 2.75 inches. The periphery of the plurality of magnets has various geometric shapes. The geometric shapes are chosen from the class of geometric shapes. The class of geometric shapes includes rectangles, a circle, and irregular shapes with lines and curves.

Provided last is a printed set of rules. The rules are uses by the players in playing the game.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetic board game which has all of the advantages of the prior art games of known designs and configurations and none of the disadvantages.

It is another object of the present invention to provide a new and improved magnetic board game which may be easily and efficiently manufactured and marketed.

It is further object of the present invention to provide a new and improved magnetic board game which is of durable and reliable constructions.

An even further object of the present invention is to provide a new and improved magnetic board game which is susceptible of a low cost of manufacture with regard to both materials and labor, and which accordingly is then susceptible of low prices of sale to the consuming public, thereby making such magnetic board game economically available to the buying public.

Even still another object of the present invention is to provide a magnetic board game for providing a competitive challenge combining chance, strategy and agility, mental and physical, while teaching players the properties of magnets, all in an entertaining and educational manner.

Lastly, it is an object of the present invention to provide a new and improved magnetic board game. An insert has a bottom with sides and a contoured top. The container has semi-spherical concave valleys. The valleys are positioned in rows and columns. The insert is fabricated of a resilient non-magnetically-responsive material. A plurality of magnets is provided. Each magnet has faces defining a thickness and a periphery. The periphery of the magnets have various geometric shapes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
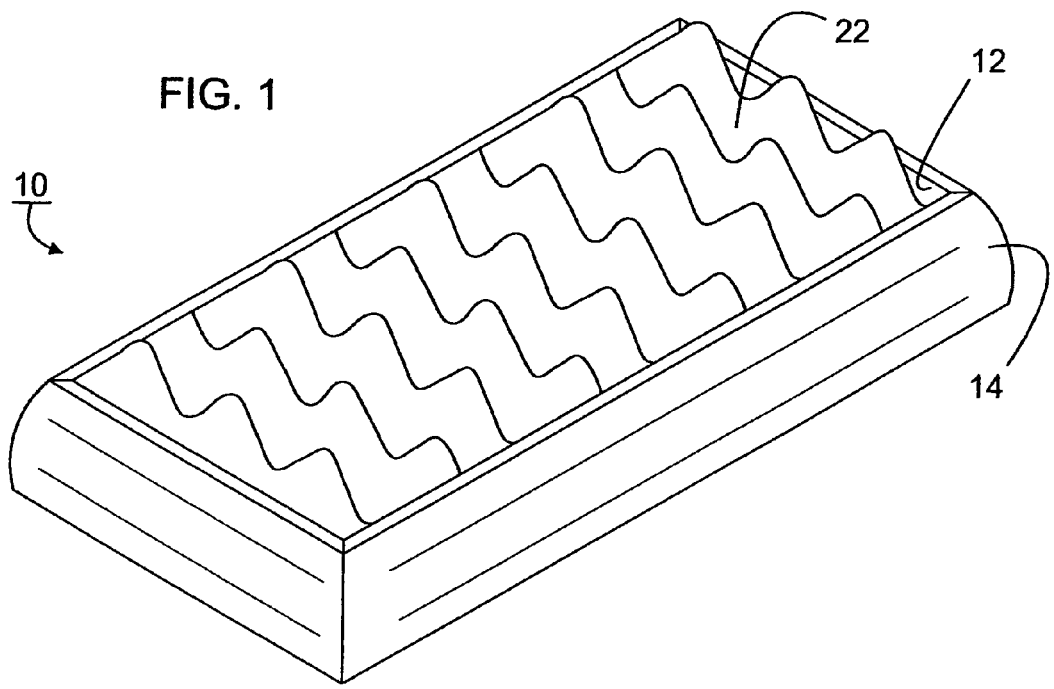
FIG. 1 is a perspective illustration of a board of a magnetic board game constructed in accordance with the principles of the present invention.
Figure 2:
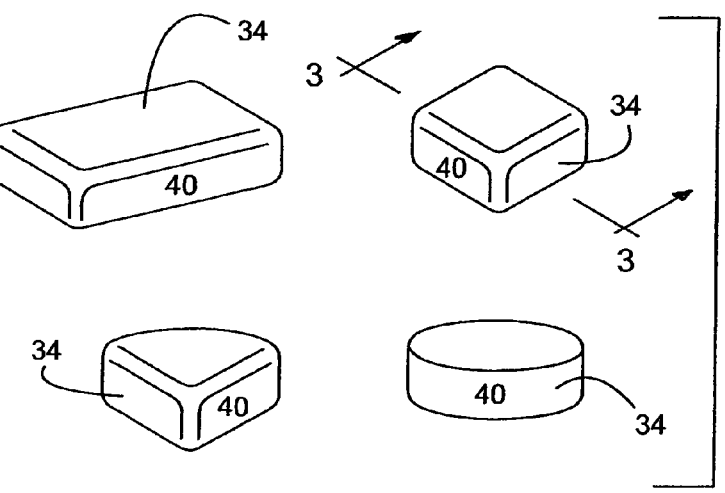
FIG. 2 is a perspective illustration of several magnets of the magnetic board game constructed in accordance with the principles of the present invention.
Figure 3:
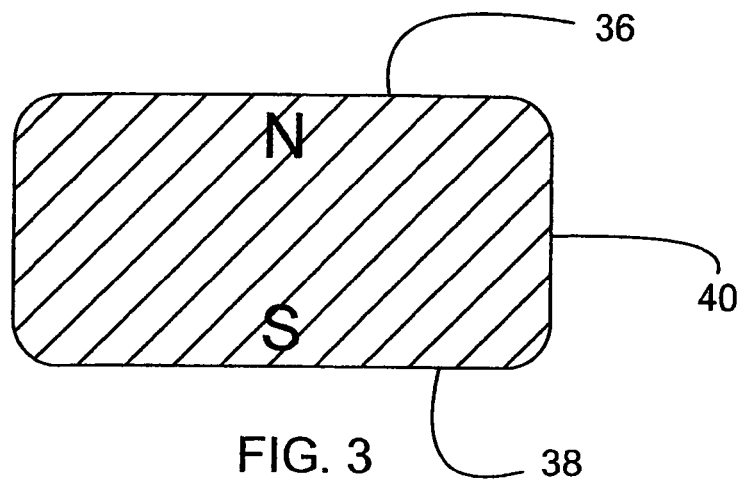
FIG. 3 is a cross sectional view of one of the magnets taken along line 3-3 of FIG. 2 and showing the north-south polar regions.
Figure 4:
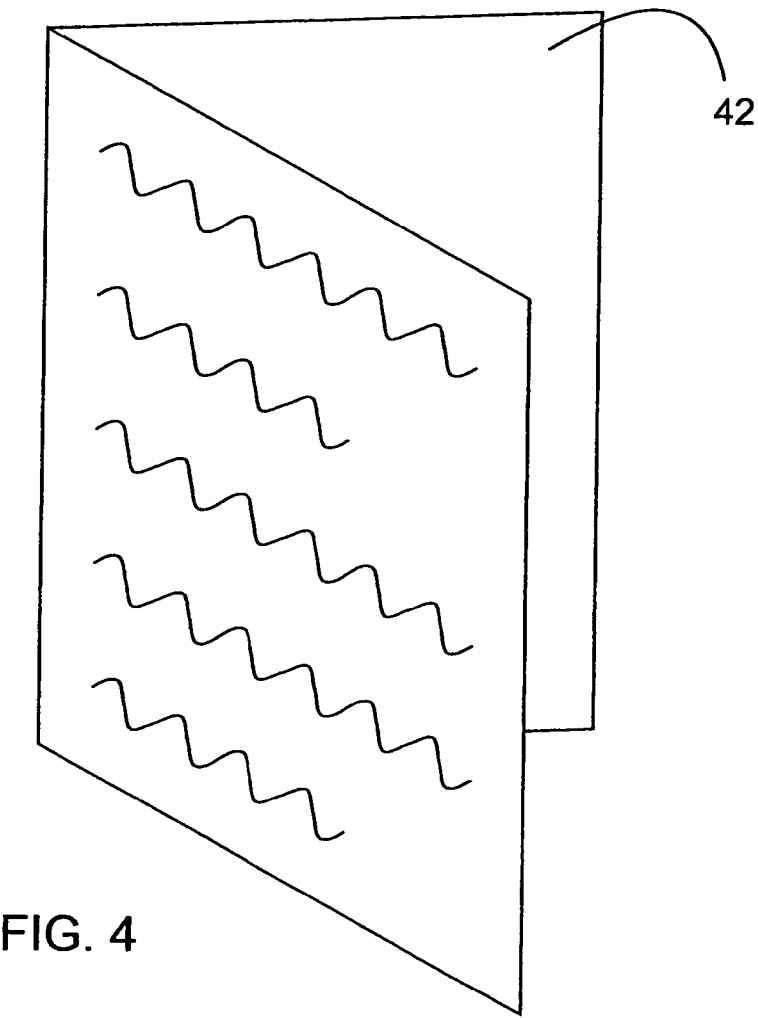
FIG. 4 is a perspective illustration of a set of rules of a magnetic board game constructed in accordance with the principles of the present invention.
Figure 5:
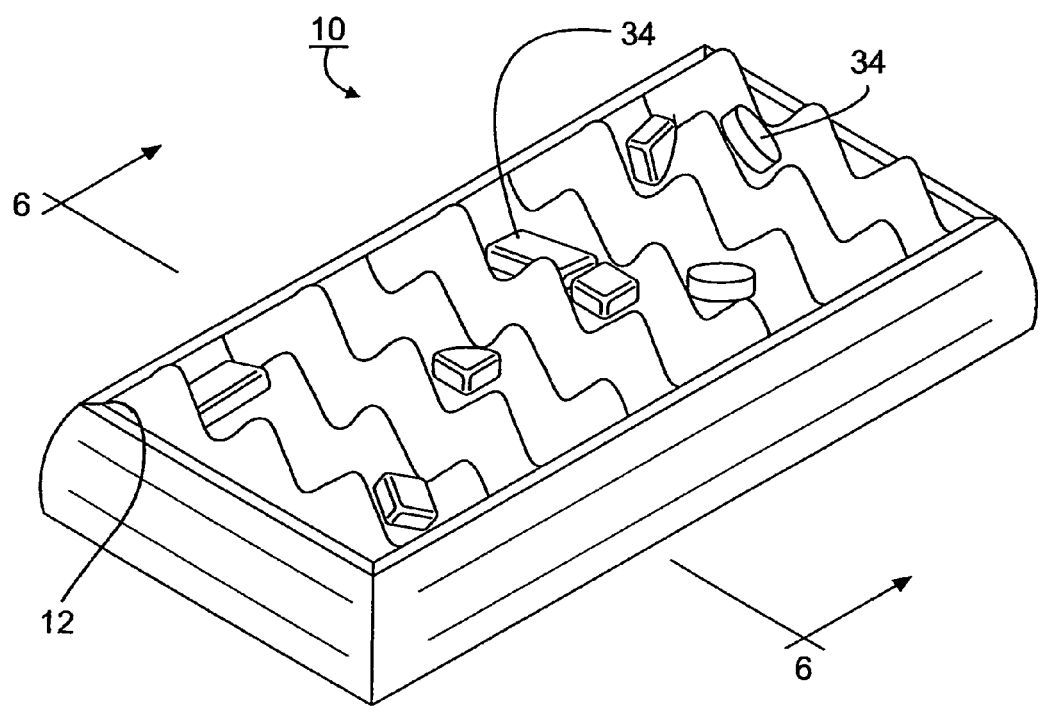
FIG. 5 is a perspective illustration of a board and magnets constructed in accordance with the principles of the present invention.
Figure 6:
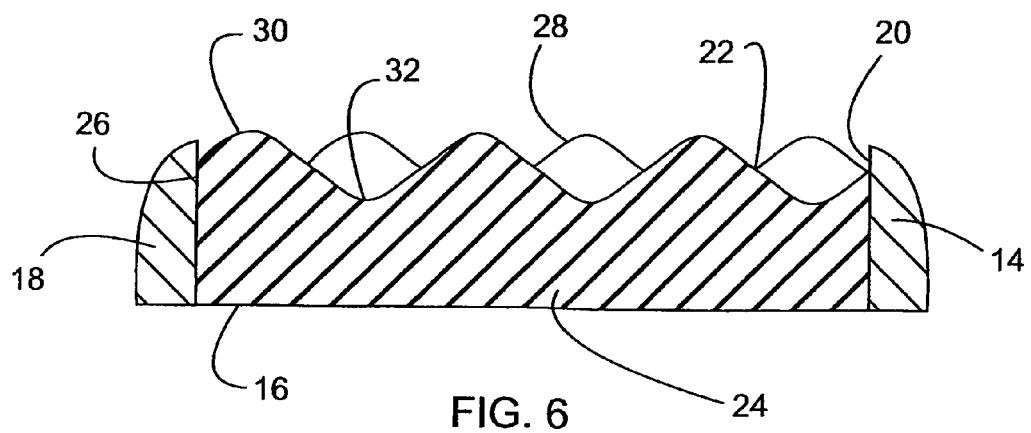
FIG. 6 is a cross sectional view taken along line 6-6 of FIG. 5.

With reference now to the drawings, and in particular to FIG. 1 thereof, the preferred embodiment of the new and improved magnetic board game embodying the principles and concepts of the present invention and generally designated by the reference numeral 10 will be described.

The present invention, the magnetic board game 10 is comprised of a plurality of components. Such components in their broadest context include an insert and a plurality of magnets. Such components are individually configured and correlated with respect to each other so as to attain the desired objective.

First provided is a board 12. The board includes a container 14. The container has a rectangular open base 16. The open base is positionable in a horizontal orientation during use. The container has vertically extending peripheral side walls 18. The base and side walls define a rectilinear chamber 20. The side walls are fabricated of a stiff non-magnetically-responsive wood or plastic.

The board also includes an insert 22. The insert has a rectangular bottom 24. The bottom is positioned adjacent to the base of the container. The insert has sides 26. The sides of the insert are positioned in contact with the side walls of the container. The insert has a contoured top 28. The contoured top has semi-spherical convex peaks 30. The contoured top has semi-spherical concave valleys 32. The valleys are positioned in rows and columns. Each row is off-set from its next adjacent row. Each column is off-set from its next adjacent column. In this manner each valley is equally spaced at about 1.25 inches plus or minus 10 percent from all immediately surrounding valleys. The peaks are positioned in rows and columns. Each row is off-set from its next adjacent row. Each column is off-set from its next adjacent column. In this manner each peak is equally spaced at about 1.25 inches plus or minus 10 percent from all immediately surrounding peaks. Each insert has between 20 and 25 valleys. Each insert has a corresponding number of peaks, preferably 22 or 23 valleys. Each peak and valley are at a common elevation with a 1.00 inch elevational spacing between the peaks and valleys. The insert is fabricated of a resilient non-magnetically-responsive open cell polyurethane foam.

A plurality of hematite magnets 34 is provided. There are 18 magnets in the preferred embodiment. The magnets have faces 36, 38. In this manner a thickness of between 0.40 inches and 0.60 inches, preferably 0.50 inches, plus or minus 10 percent, is defined. Each magnet has a periphery 40. The periphery is between 2.25 inches and 3.25 inches, preferably 2.75 inches. The periphery of the plurality of magnets has various geometric shapes. The geometric shapes are chosen from the class of geometric shapes. The class of geometric shapes includes rectangles, a circle, and irregular shapes with lines and curves.

Provided last is a printed set of rules 42. The rules are uses by the players in playing the game. The rules are as follows:

Game #1—I'm Out!

Setup—Start with 9 magnets each, or 6, for 3 players. If you find 9 magnets too challenging, start with 8 magnets each.

To Play—Take turns placing 1 magnet at a time into any empty space in the base. If 1 or more magnets attach to your magnet or to any others on the board, remove your magnet and any magnets that connected. Now you must get rid of all those extra magnets, too!

To Win—Be the first player to declare "I'm out" by getting rid of all your magnets.

Game #2—Elimination

Setup—Start with 9 magnets each, or 6, for 3 players.

To Play—Take turns placing 1 magnet at a time into any empty space in the base.

To Keep Score—For every magnet that attaches to the magnet you are placing or to any other magnet in the base while you are taking your turn, add 1 point to your score. For example: While placing your magnet, 1 magnet attaches to your magnet and 2 other magnets connect in the base: You get 3 points. Leave all already-placed magnets in the base. Continue placing new magnets into the playing surface until 1 player has no magnets left. Then clear the board and total up points for the round.

To Win—Repeat rounds until the first player to accumulate 10 points is eliminated. In a 3-player game, keep going until a second player reaches 10 points. The player who is left is the winner.

Game #3—Roundup

Setup—Divide the magnets. Alternating turns, each player places a magnet into the playing surface until 10 magnets are on the board. In the 3-player game, place 9 on the board.

To Play—On your turn, place 1 of your remaining magnets into the base so that it attracts the most magnets. Remove your "captor" magnet and all its "captives." Give yourself 1 point for each magnet you attract (not counting your original "captor" magnet). Your turn ends.

Play continues until all magnets placed on the board have been captured (the original 10 plus any additional magnets placed on the board). This ends the round. Set up the base again, with 10 magnets in it.

To Win—A round ends if one player runs out of magnets even if the board is not cleared. Rounds continue until one player has reached 12 points (12 captives) to win the game.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A magnetic board game comprising:
an insert having a bottom with sides and a contoured top formed with semi-spherical concave valleys, the valleys being positioned in rows and columns, each row being off-set from its next adjacent row and each column being off-set from its next adjacent column, each valley being equally spaced from all immediate surrounding valleys, the insert being fabricated of a resilient non-magnetically-responsive material; and
a plurality of magnets, each magnet having faces defining a thickness and a periphery, the periphery of the magnets having various differing geometric shapes.

2. The game as set forth in claim 1 and further including:
a board including a container having a rectangular open base positionable in a horizontal orientation during use with vertically extending peripheral side walls, the base and side walls defining a rectilinear chamber, the side walls being fabricated of a stiff non-magnetically-responsive wood, the board also including the insert with the sides of the insert being positioned in contact with the side walls of the container.

3. The system as set forth in claim 1 wherein the contoured top is formed with semi-spherical convex peaks and the semi-spherical concave valleys, the valleys being positioned in rows and columns, each row being off-set from its next adjacent row and each column being off-set from its next adjacent column whereby each valley is equally spaced at about 1.25 inches plus or minus 10 percent from all immediately surrounding valleys, the peaks being positioned in rows and columns, each row being off-set from its next adjacent row and each column being off-set from its next adjacent column whereby each peak is equally spaced at about 1.25 inches plus or minus
10 percent from all immediately surrounding peaks, each insert having between 20 and 25 valleys and a corresponding number of peaks, each peak and valley being at a common elevation with a 1.00 inch elevational spacing between the peaks and valleys, each the insert being fabricated of a resilient non-magnetically-responsive open cell polyurethane foam.

4. The system as set forth in claim 1 wherein each magnet has planar parallel faces defining a thickness of between 0.40 inches and 0.60 inches, plus or minus 10 percent, each magnet having a periphery of between 2.25 inches and 3.25 inches, the periphery of the plurality of magnets having various geometric shapes chosen from the class of geometric shapes including rectangles, a circle, and irregular shapes with lines and curves.

5. The system as set forth in claim 1 and further including a printed set of rules for use by the players in playing the game.

6. A magnetic board game for providing a competitive challenge combining chance, strategy and agility, mental and physical, while teaching players the properties of magnets, all in an entertaining and educational manner comprising, in combination:
a board including a container having a rectangular open base positionable in a horizontal orientation during use with vertically extending peripheral side walls, the base and side walls defining a rectilinear chamber, the side walls being fabricated of a stiff non-magnetically-responsive wood;
the board also including an insert having a rectangular bottom positioned adjacent to the base of the container with sides positioned in contact with the side walls of the container, the insert having a contoured top formed with semi-spherical convex peaks and semi-spherical concave valleys, the valleys being positioned in rows and columns, each row being off-set from its next adjacent row and each column being off-set from its next adjacent column whereby each valley is equally spaced at about 1.25 inches plus or minus 10 percent from all immediately surrounding valleys, the peaks being positioned in rows and columns, each row being off-set from its next adjacent row and each column being off-set from its next adjacent column whereby each peak is equally spaced at about 1.25 inches plus or minus 10 percent from all immediately surrounding peaks, each insert having between 20 and 25 valleys and a corresponding number of peaks, each peak and valley being at a common elevation with a 1.00 inch elevational spacing between the peaks and valleys, the insert being fabricated of a resilient non-magnetically-responsive open cell polyurethane foam;
a plurality of hematite magnets, faces defining a thickness of between 0.40 inches and 0.60 inches, plus or minus 10 percent, each magnet having a periphery of between 2.25 inches and 3.25 inches, the periphery of the plurality of magnets having various geometric shapes chosen from the class of geometric shapes including rectangles, a circle, and irregular shapes with lines and curves; and
a printed set of rules for use by the players in playing the game.

* * * * *